Aug. 2, 1932.   S. W. JANSEN   1,870,122

AUTOMOBILE ANTISQUEAK WELT

Filed Oct. 1, 1930

INVENTOR.
STANLEY W. JANSEN

BY
Barnes & Kisselle
ATTORNEYS.

Patented Aug. 2, 1932

1,870,122

UNITED STATES PATENT OFFICE

STANLEY W. JANSEN, OF DETROIT, MICHIGAN, ASSIGNOR TO BACKSTAY WELT COMPANY, OF UNION CITY, INDIANA, A CORPORATION OF INDIANA

AUTOMOBILE ANTISQUEAK WELT

Application filed October 1, 1930. Serial No. 485,757.

This invention is concerned with automobile anti-squeak welt. Among the objects of the invention is the provision of an improved welt construction which will permit of the passage of a bolt or other fastening device through it at substantially any point along its length, yet one which is arranged to have a sort of locking arrangement with bolts or securing devices so that the welt will not slip out of place. In this regard it may be stated that the welt is bent around curves and corners to conform to the shape of the part into which it is inserted, and particularly, at this point there is a tendency for the welt to work out of place. This will be better appreciated as the detailed description progresses.

Figure 7:
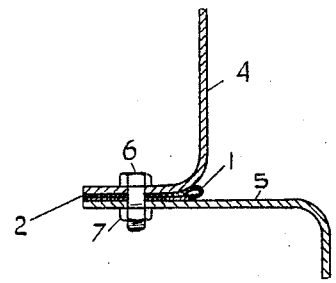
Fig. 7 is a sectional view taken through a construction showing the welt in place.

The welt comprises, in general, a length of material having a bead 1 and flange 2. This may be constructed by folding a strip of material upon itself with a filler 3. Fig. 7 illustrates the use of the welt and in this figure the side of an automobile is illustrated at 4, a fender at 5. Between these abutting metallic members the flange of the welt is placed, as shown, leaving the bead exposed and a suitable securing device such as a bolt 6 extends through the facing members and may be secured by a nut 7. The flange 2 keeps the metal members out of contact and accordingly prevents squeaks, rattles, etc.

Figure 1:
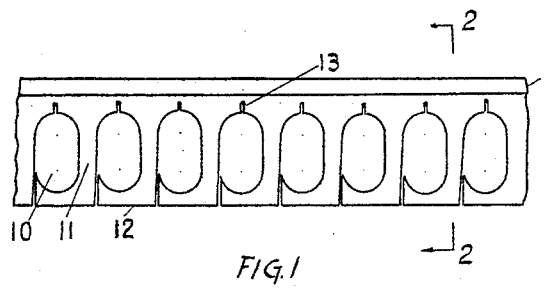
Fig. 1 is a plan view of a section of the welt illustrating one of a number of forms the invention may take.
Figure 2:
Fig. 2 is a sectional view of line 2—2 of Fig. 1.

The welt is advantageously made up in lengths with its flange slotted transversely, or cut out, as at 10, leaving spaced tines or projections 11. As shown in Fig. 1 the cut-out is of oval formation and the tines or projections are generally L shaped. In this form the vertical part of the L defines part of the cut-out openings while the horizontal portion of the L extends lengthwise of the welt, as at 12, and serves to substantially close the openings.

Figure 6:
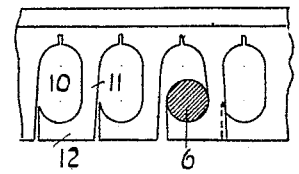
Fig. 6 illustrates how a bolt or other securing device may be placed through the welt by distortion or displacement of one or more of the projecting tines or legs.

A securing bolt or the like may be placed through this welt at almost any point along its length. This makes it feasible to manufacture and supply the welt in continuous lengths so that in an installation on an automobile it need only be cut to the proper length and inserted. In other words, automobiles of various manufacturers and various models of one or more manufacturers may have the securing bolts located in different positions and may require different lengths of welt; nevertheless, they all can use the same welt regardless of where the bolts are located, as the individual tines or projections are capable of flexing, as illustrated in Fig. 6, to permit a bolt to pass through the flange although it does not exactly align with a cutout or slot. Accordingly, the welt does not have to be punched with accurately positioned openings for bolts.

The horizontal portion 12 of the L is effective for hooking or locking behind the securing bolts, and when the two metal parts 4 and 5 are drawn tightly together the flange is clamped tightly between them; the L which hooks behind a bolt, is securely held in position so that it cannot get away, with the result that the welt is effectively held in position. Where the welt is bent around curves, corners or the like, as illustrated in Fig. 3, there is a tendency for the welt to straighten out or work out of place and the gripping of the tines behind the bolt is particularly effective at these points.

Figure 3:
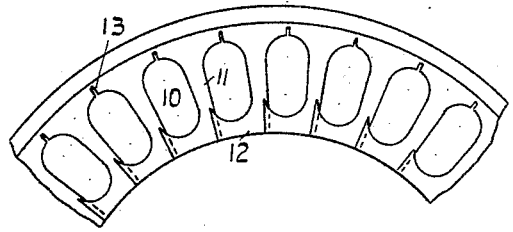
Fig. 3 is a view showing the welt curved depicting the shape the welt takes substantially at a curve or corner.

Moreover, it will be noted that the welt construction nicely permits the flange to be bent, as the tines may lap over each other, as shown in Fig. 3, and in order to further facilitate this bending, the portion of the flange near the bead may be cut, as at 13. This is advantageous in that it permits the cut-out slots to be located a reasonable distance away from the bead yet providing the flange portion next adjacent the bead with sufficient flexibility for the purpose.

Figure 4:
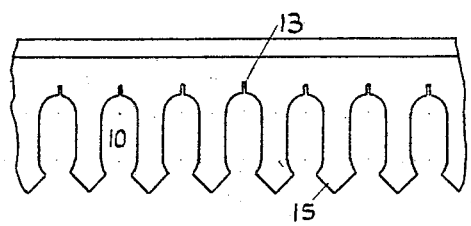
Figs. 4 and 5 show modified forms of welt construction.
Figure 5:
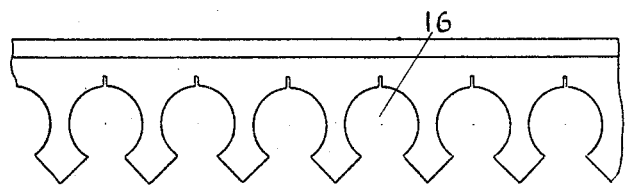

The tines may take various forms for effecting these results, as for example, in Fig. 4 the tines instead of being L shaped have enlarged heads 15 which are enlarged in both directions; the enlargements in this form are not sufficiently great to entirely close the slot, yet when these enlargements engage behind a bolt or the like, and are tightly clamped between members and held in position the welt is effectively held in place. Fig. 5 illustrates a form similar to that of Fig. 4, but here the cut-out portions instead of being elongated are generally more round, as at 16. Both the forms shown in Figs. 4 and 5 are capable of being bent around curves or corners, and either one or both may be additionally slotted, as at 13.

I claim:

1. An automobile anti-squeak welt or the like comprising a strip of material having a bead portion and a flange portion which is adapted to be disposed between abutting members, said flange consisting of a multiplicity of separate projections between which a securing device is adapted to pass, said projections having enlarged heads for locking behind said securing means.

2. An anti-squeak welt for an automobile or the like comprising a strip of material having a bead along one edge, a flange portion projecting from the bead, said flange portion being provided with slots extending through one edge and into close proximity with the bead to provide spaced flange parts which are free at one end, said spaced parts at their free ends being provided with enlarged portions.

3. An anti-squeak welt for an automobile or the like comprising a strip of material cut in on one edge to provide spaced projections with the other edge being substantially unbroken, said spaced projections having enlarged parts at the cut-in edge.

4. An anti-squeak welt for an automobile or the like, comprising a strip of material having a bead along one edge, a multiplicity of spaced projections extending from the bead forming a flange adapted to be disposed between abutting structural members and through which a bolt or other securing means is adapted to pass, said projections having enlarged parts at the side of the strip of material opposite the bead for locking around said bolt or securing means.

5. An anti-squeak welt for automobiles or the like comprising a strip of material having a bead along one edge and a flange projecting therefrom formed by a multiplicity of separate L shaped projections, the base portion of the L being at the free end of the projections.

6. An anti-squeak welt for automobiles or the like, comprising a strip of material having a bead along one edge and a flange projecting therefrom, said flange being provided with a multiplicity of substantially transversely extending slots extending from near the bead to near the free edge of the flange, said flange being cut in from the free edge thereof to the slots to provide separate L shaped flange parts.

7. An anti-squeak welt for automobiles or the like, comprising a strip of material having a bead along one edge and a flange projecting therefrom, said flange being provided with a multiplicity of substantially transversely extending slots extending from near the bead to near the free edge of the flange, said flange being cut in from the free edge thereof to the slots to provide separate flange parts with enlarged heads.

8. An anti-squeak welt for automobiles or the like comprising a strip of material having a bead along one edge and a flange projecting therefrom, said flange being slotted transversely to provide separate flange parts, the free end of each flange part having an enlarged head with the enlargement extending in both directions longitudinally from the flange part and at least partially enclosing the adjacent slots on each side of the flange part.

9. An anti-squeak welt for automobiles or the like comprising a strip of material having a bead along one edge, a flange projecting from the bead, said flange being slotted through its free edge to a point in close proximity to the bead to provide a multiplicity of separate projections, said flange between the bead and the slot being cut whereby to render the flange part between the bead and slotted portion bendable, each separate projection defined by the slots having an enlarged head whereby the slots are at least partially closed at the free edge of the flange.

10. A fender welt comprising a strip body portion having a beaded edge, and fingers transversely projecting from said edge, each of said fingers being enlarged at its end.

11. A fender welt comprising a strip body portion having a beaded edge, and fingers transversely projecting from said edge, each of said fingers being enlarged at its end, the spaces between the fingers forming slots, substantially closed by the enlargements at the ends of the fingers.

12. A fender welt comprising a strip body portion having a beaded edge, and fingers transversely projecting from said edge, each of said fingers being enlarged at its end, the enlargement on one finger overlapping a portion of the neighboring finger.

13. A fender welt comprising a filler, a covering fabric therefor folded around the filler and extended from one side thereof to provide a relatively wide flange, said flange being broken inwardly from its outer edge to provide a plurality of transverse tongues, and an enlargement formed in each tongue.

In testimony whereof I affix my signature.

STANLEY W. JANSEN.